April 30, 1935.    R. M. BAGLEY ET AL    1,999,797
GREASE DISPENSER
Filed Feb. 23, 1932    2 Sheets-Sheet 1
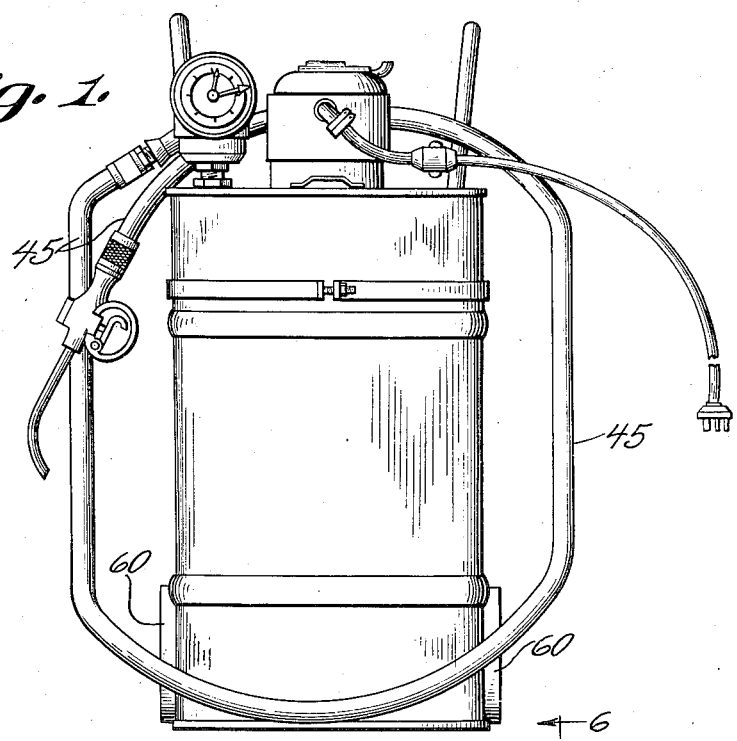
Fig. 1.
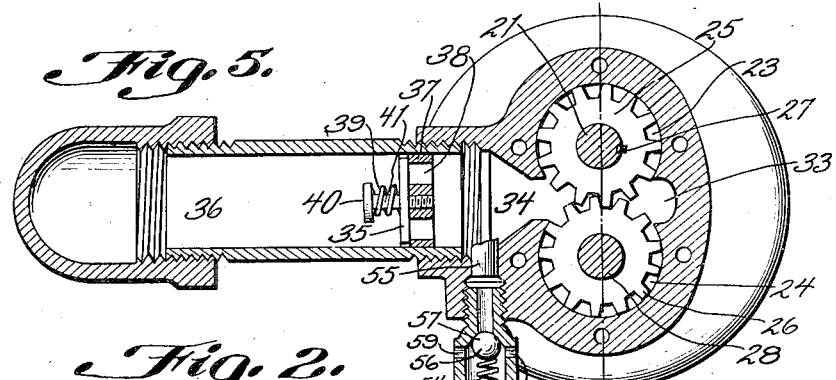
Fig. 5.
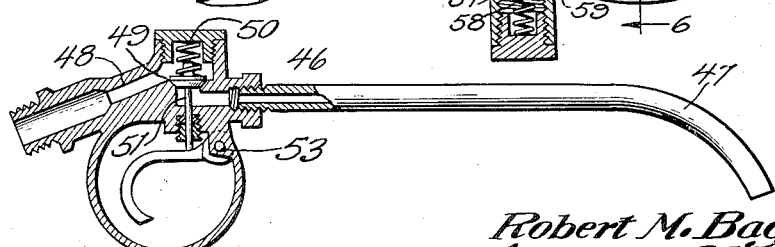
Fig. 2.
Robert M. Bagley
and George J. Huntley
INVENTORS
BY Leonard L. Kalish
ATTORNEY

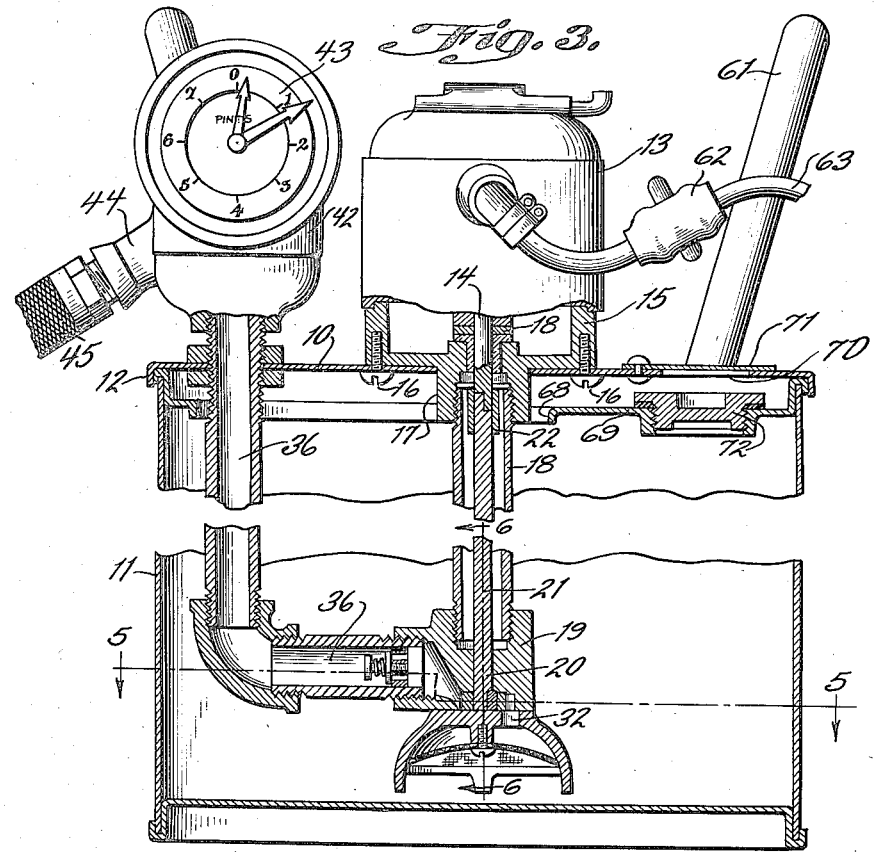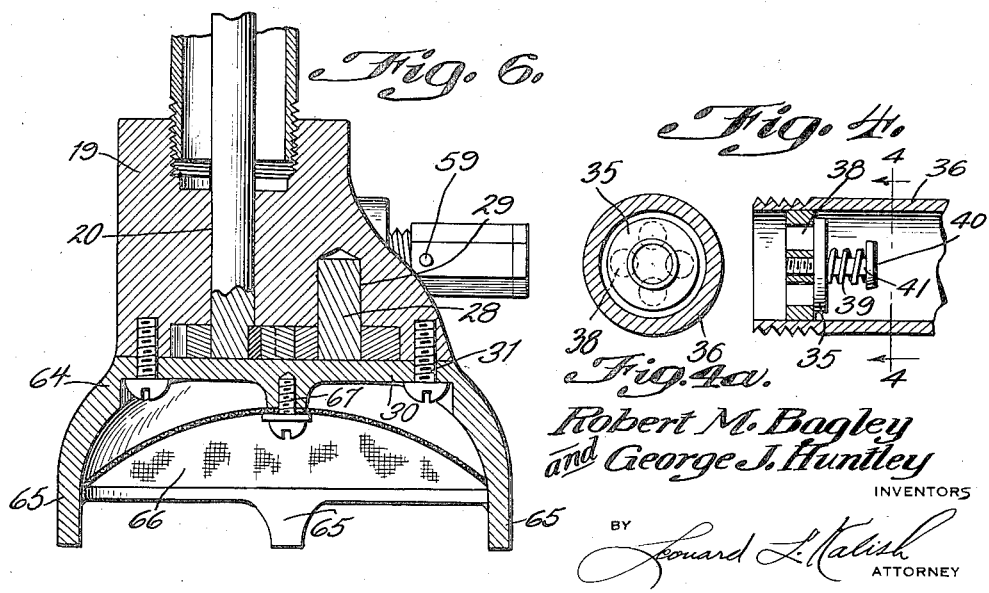

UNITED STATES PATENT OFFICE 1,999,797

GREASE DISPENSER

Robert M. Bagley, Haddonfield, N. J., and George J. Huntley, Baltimore, Md.; said Huntley assignor to said Bagley Application February 23, 1932, Serial No. 594,602

3 Claims. (Cl. 221—95)

The present invention relates to grease dispensing devices, whereby a lubricant, such as grease, may be dispensed and measured.

It is an object of the present invention to provide a means whereby the lubricant, such as grease, may be removed from or dispensed from the original container or drum without first being transferred to another container for the purpose.

A further object of the present invention is to provide means whereby lubricant may be dispensed in measured quantities through a suitable flow meter having appropriate indicator and whereby the possibility of a false indication of measure is eliminated when the grease container is empty. Thus, should the grease container be empty, the continued operation of the mechanism will not cause the indicator to register falsely, that is, it will not register unless grease is actually passed through it.

With the above and other objects in view, the invention consists of a metered dispensing unit which is adapted to be inserted into a drum or barrel or other container of grease or other lubricant;—said unit including a panel serving both as a mounting panel as well as a closure member for the drum, an electric motor mounted upon said panel, a tubular housing member projecting from said motor down into the container, and carrying a pump housing at its lower end, and a drive shaft extending through said tubular housing member, a discharge pipe extending from said pump housing up to and through said panel, a flow meter at the upper end of said discharge conduit, and valves so arranged that the pump may be operated continuously, and whereby the flow through the meter may be intermittent at the will of the operator whereby said flow is controlled by a terminal hand operable valve on the end of the discharge hose leading from the meter.

The invention further consists of other novel features which will appear more fully from the following detailed description.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organization of the instrumentalities as herein shown and described.

Referring to the drawings in which like reference characters indicate like parts:

Figure 1 represents a front elevational view of the metered grease dispensing unit embodying the present invention, shown mounted upon a drum containing grease.

Figure 2 represents a longitudinal sectional view of the manually operable discharge valve which controls the flow of lubricant.

Figure 3 represents a generally vertical sectional view of the dispensing unit and the grease drum, partly broken away.

Figure 4 represents an enlarged sectional view of the exhaust valve of the pump on an enlarged scale.

Fig. 4a is a section on line 4a of Fig. 4.

Figure 5 represents a section on line 5—5 of Figure 3, on a much enlarged scale.

Figure 6 represents a section on line 6—6 of Figure 5 on the same scale as Figure 5.

The novel electric metered grease dispenser forming the subject of the present invention includes a main panel 10, which is preferably a sheet metal plate or any other suitable plate member of a diameter corresponding to the diameter of the drum 11, which constitutes the original container in which the grease or other lubricant is supplied and shipped. The panel 10 may be provided with a downwardly depending flange 12 which engages the periphery of the top of the drum 11 so as to center the panel 10 with respect to the drum at all times. An electric motor 13, of any suitable electrical type, is mounted upon the panel 10. The motor 13 is mounted with its axis and shaft 14 disposed generally at a right angle to the panel 10, so as to be in a vertical position when mounted upon the drum 11. The lower housing member 15 of the motor 13 forms the supporting base for the motor, and is directly attached to the panel 10 by means of screws 16 which extend through the panel and which are threaded into corresponding threaded holes in the housing member 15. The lower housing member 15 of the motor 13 also includes a downwardly depending hollow tubular projection or member 17, coaxial with respect to the shaft 14 of the motor and which is screw-threaded internally to receive the correspondingly though externally threaded tubular pump support 18. The rotor or armature (not shown in the drawings) of the motor 13 is supported by thrust bearings 19, which are indicated somewhat diagrammatically in Figure 3, but which may be of any suitable type of bearing.

The tubular pump supporting member 18 is firmly threaded into the depending portion 17 of the motor housing member 15 and extends downwardly in a generally vertical direction or at a right angle to the panel 10. The lower end of the tubular pump supporting member 18 is also threaded, and to this lower threaded end, the pump housing 19 is secured, as by threading (as indicated in Figure 3). The pump housing 19 includes the vertical bearing opening 20, in which the lower end of the vertical pump shaft 21 is suitably journalled. The upper end of the pump shaft 21 is detachably coupled with the motor shaft 14 in a manner indicated particularly in Figure 3. Thus, the juxtaposed lower and upper ends of the motor shaft 14 and pump shaft 21, respectively, are each half cut away and the cut-away ends are then overlapped and surrounded by a coupling tube 22, which retains them in fixed relation to each other against rotary displacement with respect to each other. The coupling sleeve 22 may be pinned or otherwise fixed to the pump shaft 21. In the bottom of the pump housing 19, a pair of similar circular gear chambers 23 and 24 are provided with their peripheries intersecting each other. Similar gears 25 and 26 are mounted in the chambers 23 and 24 respectively, the outermost diameters of the teeth of said gears clear the peripheries of the chambers by an amount sufficient to provide a running clearance, and the gears 25 and 26 mesh with each other loosely. The gear chamber 23 is co-axial with respect to the pump shaft 21, and the gear 25 is mounted upon and is keyed to the pump shaft 21 as indicated particularly in Figures 5 and 6, by means of a suitable key 27.

The gear 26 is an idle gear, being loosely mounted on a stationary pivot pin 28, which is mounted in a corresponding opening 29 in the pump housing 19.

The gear chambers 23 and 24 are closed by a lower closure plate 30, which is attached to the pump housing by means of the screws 31. An intake opening 32 extends through the closure cover plate 30 of the pump, through which the grease is taken into the intake chamber 33 of the pump. The driving gear 25 and the driven gear 26, driven by the motor 13, carry the lubricant from the intake chamber 33 to the exhaust chamber 34, and there force the same past the check valve 35 into the discharge pipe 36. The check valve 35 may be any suitable construction, as for instance, that shown in Figure 5, wherein a transverse valve housing member 37 is mounted in the discharge pipe 36, having a suitable number of holes 38 therethrough, and wherein the valve plate 35 is held against said valve housing member 37, normally to close the openings 38 therethrough, by means of a helical compression spring 39 interposed between the valve plate 35 and the head 40 of the screw or other spring support 41.

The lubricant forced into the discharge pipe 36 is then passed through the upright part of the discharge pipe into a suitable flow meter 42 mounted upon the top of the upright discharge pipe 36 as indicated particularly in Figure 3. The flow meter 42 may be any suitable construction, having an indicator dial 43 adapted to indicate the volume of material flowing through the meter. The meter 43 discharges through a discharge opening 44, to which a flexible hose 45 is attached. To the end of the flexible discharge hose 45, the hand operable valve 46 is secured, having the discharge nozzle 47, the valve housing 48 and the valve 49 therein which is normally closed by the spring 50 as well as by the pressure of the fluid in the hose 45. The stem 51 of the valve 49 is acted upon by a lever or trigger 52 pivoted at 53, whereby the valve may be readily opened by a simple manual operation.

A relief valve housing 54 is threaded into the relief opening 55 of the pump housing 19, as indicated particularly in Figures 5 and 6. The relief valve housing includes a ball check valve or any other suitable check valve 56 which is normally held against the valve seat 57, by means of the helical compression spring 58, thereby normally closing the relief opening 55. A suitable number of openings 59 are provided in the relief valve housing 54 through which the lubricant may be passed.

The size of the helical compression spring 58 and the exposed area of the relief valve 56 are so proportioned with respect to the size of the spring 59 and the exposed area of the check valve 35, that the check valve 35 will open at a pressure considerably lower than that required to open the relief valve 56. By this means, the lubricant will normally be delivered through the discharge pipe 36 and through the meter 42, the hose 45 and the discharge valve 46, so long as the discharge valve 46 is open. If the discharge valve 46 is closed (which is effected by merely releasing the finger grip on the trigger 52) the back pressure created in the conduit system between the pump and the valve 46 causes the relief valve 56 to be opened, thereby discharging the grease from the pump back into the drum, so long as the motor and pump are operating.

By this means, the motor and pump may be permitted to operate independently of the flow of lubricant through the discharge valve 46 and nozzle 47. Thus, when it is desired to fill a gear case of an automobile, for instance, the grease drum 11, mounted upon any suitable wheeled truck 60, having a handle 61, is wheeled to the automobile, and the motor started by means of the switch 62 in the electrical line or flexible electric cord 63 leading from the nearest electric outlet to the motor 13. While the motor is thus running, the operator then inserts the nozzle 47 into the filling opening of the gear case, and by opening the valve 46, admits into the gear case any amount of grease desired, the amount being indicated by the meter 42.

Due to the construction of the pump and the relation of the valve 35 thereto, the pump will not pump any air past the check valve 35 to the meter 42. Thus, if the container should become empty while the pump is operating, and while the valve 46 is open, the meter will not continue to register further quantities, because there will be no flow through the meter. Thus, any air that may be taken in by the pump will not pass the valve 35, but will be merely circulated around in the gear chambers within the pump housing.

A downwardly depending flange or skirt 64 may be provided from the closure plate 30 of the pump, having downwardly depending leg portions 65. A screen 66 may be secure in the downwardly depending flange or skirt 64, by means of a screw 67. The screen 66 will tend to prevent the entry of solid objects into the pump, should they accidentally find their way into the grease contained within the drum 11.

The distance between the tubular pump support 18 and the upright discharge pipe 36 of the pump 19 is such that the two generally parallel members 18 and 36 may be inserted into the opening 68 of the upper cover or top wall 69 of the steel drums. Thus, the opening 86 of the top 69 of the drum 11 receives the lower part of the unit, including the members 18 and 36, as indicated in Figure 3. An opening 70 is also provided in the panel 10, covered by a pivotally mounted closure plate 71, which is positioned directly above the screw-plugged opening 72 of the top 69 of the drum 11. Thus, if desired, the screw-thread plug 72 in the top 69 of the drum 11 may be removed before the dispensing unit is applied to the drum, and thereafter, access may be had to the interior of the drum either for inspection purposes or for other purposes, by simply deflecting the pivoted cover member 71 away from the opening 70.

The invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed is:

1. An electric lubricant dispensing unit, adapted to be mounted upon an original container containing lubricant, including a generally horizontally disposed panel, an electric motor mounted upon said panel having its drive shaft disposed generally at a right angle to said panel, a downwardly depending hollow pump support extending downwardly from said motor in operative alignment with the shaft thereof, a pump housing rigidly carried at the lower end of said pump support, a generally vertical rotary shaft disposed within said pump support and loosely coupled to the motor shaft, a gear within said pump housing driven by said pump shaft, an idle gear within said pump housing in mesh with said first-named gear, an inlet opening in said pump housing to admit fluid to said gears, a discharge opening in said housing to permit the passage of fluid from said gears, a discharge conduit extending from said discharge opening in said pump housing, up to and through said panel, a flow meter mounted upon said panel in communication with said discharge conduit, a flexible hose connected to the discharge opening of said flow meter, and a manually operable control valve on said hose for controlling the flow of lubricant therethrough and through said meter, a check valve intermediate said gears and said flow meter for limiting the passage of fluid in a direction from the former to the latter, and a relief valve communicating with the discharge opening of said pump housing for discharging lubricant back into the container from which it is derived by the pump, whenever the manually operable control valve is closed while the motor is running; the clearance between said gears and the pump-housing and the opening-pressure of said check valve being so related to each other as to enable the pump when driven at normal speed and operating on lubricant, to develop pressure substantially in excess of the opening-pressure of the check valve, and to develop pressure substantially below the opening pressure of said check valve when driven at normal speed and operating on air, that is, without a continuous supply of lubricant.

2. An electrical lubricant dispensing unit, adapted to be mounted upon an original container containing lubricant, including a generally horizontally disposed mounting panel, adapted to be detachably mounted upon the upper open end of an original container containing lubricant, an electrical motor mounted upon said panel with its driving shaft disposed generally at a right angle to said panel, a downwardly depending hollow pump support extending downwardly from said motor in operative alignment with the shaft thereof, a pump housing rigidly carried at the lower end of said pump support, a generally vertical rotary pump shaft disposed within said pump support and coupled to the motor shaft, a pump rotor within said pump housing driven by said pump shaft, said pump rotor being positioned within a rotor chamber within said pump housing, and being arranged for coaction with the walls of said chamber to effect a displacement of lubricant when rotated, an inlet opening in said pump housing to admit fluid to said chamber and rotor, a discharge opening in said housing to permit the passage of fluid from said chamber and rotor, a discharge conduit extending from said discharge opening in said pump housing, up to and through said mounting panel, a flow meter mounted upon said mounting panel in communication with said discharge conduit, a flexible hose connected to the discharge opening of said flow meter, a manually operable control valve on said hose for controlling the flow of lubricant therethrough and through said meter, a check valve intermediate said rotor and said flow meter for limiting the passage of fluid in a direction from the former toward the latter, and a relief valve communicating with the discharge opening of said pump housing for discharging lubricant back into the container from which it is derived by the pump, whenever the manually operable control valve is closed while the motor is running; the clearance between said gears and the pump-housing and the opening-pressure of said check valve being so related to each other as to enable the pump when driven at normal speed and operating on lubricant, to develop pressure substantially in excess of the opening-pressure of the check valve, and to develop pressure substantially below the opening pressure of said check valve when driven at normal speed and operating on air, that is, without a continuous supply of lubricant.

3. An electrical lubricant dispensing unit adapted to be mounted upon an original container containing lubricant, including a mounting panel adapted to be positioned on top of the container, a rotary electric motor carried by said panel, a downwardly depending pump support extending downwardly from said panel, a pump housing rigidly carried at the lower end of said pump support, having a rotor chamber therein and having an inlet opening therethrough and a discharge opening therethrough communicating with said rotor chamber, a pump rotor within said rotor chamber in said pump housing, arranged for coaction with the walls of said chamber to effect a displacement of lubricant when rotated, in a direction from the inlet opening towards the discharge opening, there being a slight clearance between the rotor and the effective walls of the rotor chamber, a downwardly extending rotary driving shaft operatively connecting said rotor with said rotary electric motor, a discharge conduit extending from said discharge opening in said pump housing through said mounting panel, a flow meter carried by said panel in communication with said discharge conduit, a flexible hose connected to the discharge opening of said flow meter, a manually operable control valve on said hose for controlling the flow of lubricant therethrough and through said meter, a check valve intermediate said rotor and said flow meter for limiting the passage of fluid in a direction from the former towards the latter, said check valve being yieldably urged into its closed position by a force insufficient to resist the pressure created by the rotor when acting upon lubricant, but sufficient to resist the lesser pressure created by the rotor when acting upon air (due to the slippage of air in the clearance between rotor and housing wall), as when the level of grease in the container has fallen below the inlet opening of the pump, and a relief valve communicating with the discharge opening of said pump housing for discharging lubricant back into the container from which it is derived by the pump, whenever the manually operable control valve is closed while the motor is running.

ROBERT M. BAGLEY.
GEORGE J. HUNTLEY.